Dec. 8, 1953 W. E. RENICK 2,661,763
RELIEF, SEQUENCE, AND UNLOADER VALVE
Filed Oct. 22, 1952 2 Sheets-Sheet 1

INVENTOR.
WENDELL E. RENICK
BY
*Herschel C. Omohundro*
attorney

Dec. 8, 1953
W. E. RENICK
2,661,763
RELIEF, SEQUENCE, AND UNLOADER VALVE
Filed Oct. 22, 1952
2 Sheets-Sheet 2
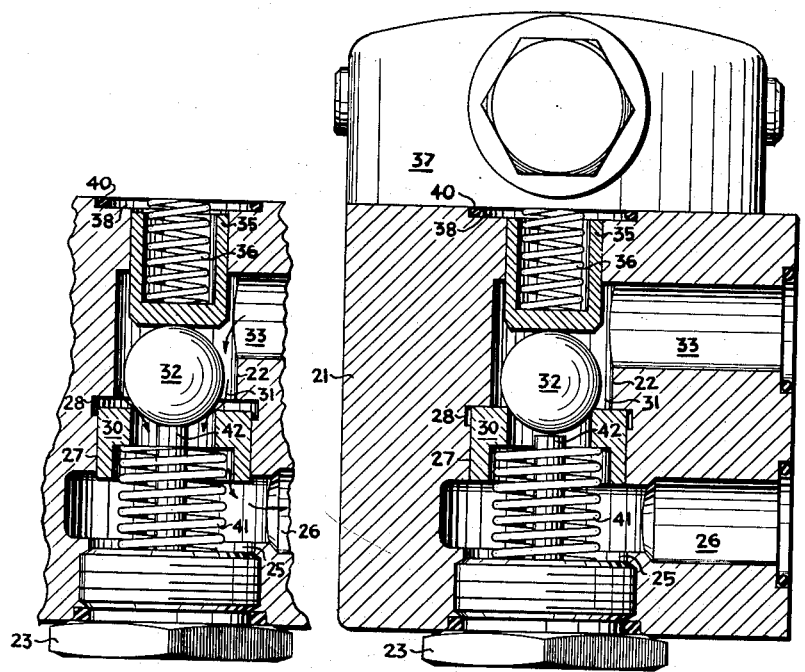
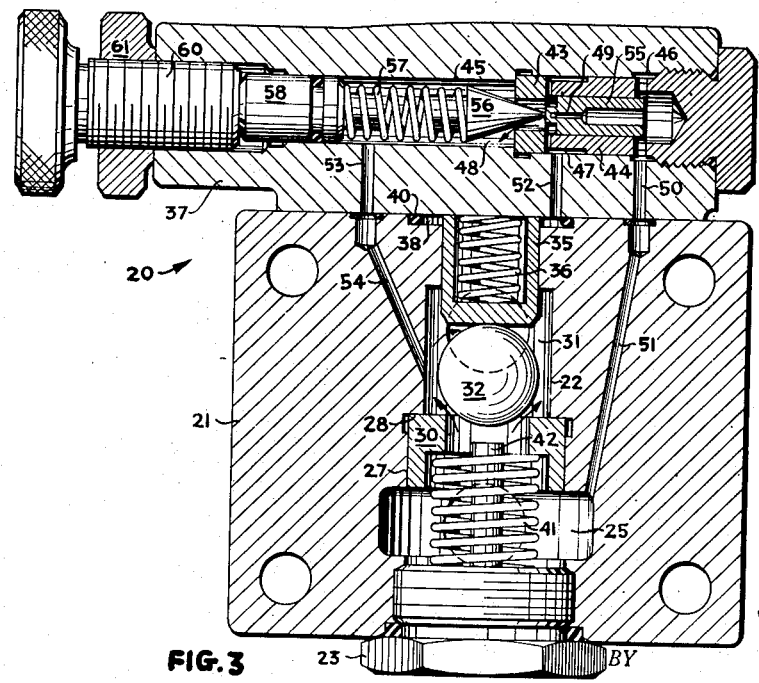
INVENTOR.
WENDELL E. RENICK
Herschel C. Omohundro
Attorney Patented Dec. 8, 1953

2,661,763

UNITED STATES PATENT OFFICE 2,661,763

RELIEF, SEQUENCE, AND UNLOADER VALVE

Wendell E. Renick, Columbus, Ohio, assignor to The Denison Engineering Company, Columbus, Ohio, a corporation of Ohio Application October 22, 1952, Serial No. 316,128

4 Claims. (Cl. 137—489)

This invention relates generally to hydraulics and is more particularly directed to valve mechanism for controlling fluid pressures, such valve mechanism being of the type generally referred to in the art as relief, sequence and unloader valves.

An object of this invention is to provide a simple double-acting or dual purpose valve for use as a relief valve to control fluid pressures and being of the type having a main valve and a pilot valve, the latter portion of the valve being substantially identical to the pilot valve shown and described in my Patent No. 2,580,128, issued December 25, 1951.

Another object of the invention is to provide a fluid pressure control valve which may be connected with a hydraulic circuit having portions with different pressures therein, the portion with the higher pressure being connected with the inlet of the valve and the other portion being connected with the outlet, the valve being so constructed that, in the event the portion generally having the lower pressure should be subjected to a higher pressure, the valve may operate to provide reverse flow so that the unusual condition will be quickly eliminated; the valve will thus protect the various parts of the hydraulic system against injury when such unusual condition exists.

A still further object of the invention is to provide a pressure control valve which will be simple to manufacture and assemble, the number of parts requiring precise dimensions being reduced to a minimum.

Another object is to provide a valve having a body with an internal bore with which inlet and outlet ports communicate at spaced points, the body receiving a seat element and a valve element for engagement with the seat, this valve element being responsive to fluid pressure to move toward and away from the seat, a pilot valve being provided to control the pressures to which the valve element is responsive, the seat element being also responsive to fluid pressures to move in the valve body and provide for the disengagement of the valve therefrom when unusual pressure conditions exist in the bore.

Further object and advantages of the present invention will be apparent from the following description, reference being had to the accompanying drawings wherein a preferred form of embodiment of the invention is clearly shown.

In the drawings:

Fig. 3 is a view similar to Fig. 2 showing parts of the valve in different positions of operation;

Fig. 4 is a vertical transverse sectional view taken through the valve on the plane indicated by the line IV—IV of Fig. 2; and Fig. 5 is a fragmentary vertical transverse sectional view showing the valve elements in position to permit reverse flow through the valve.

Figure 1:
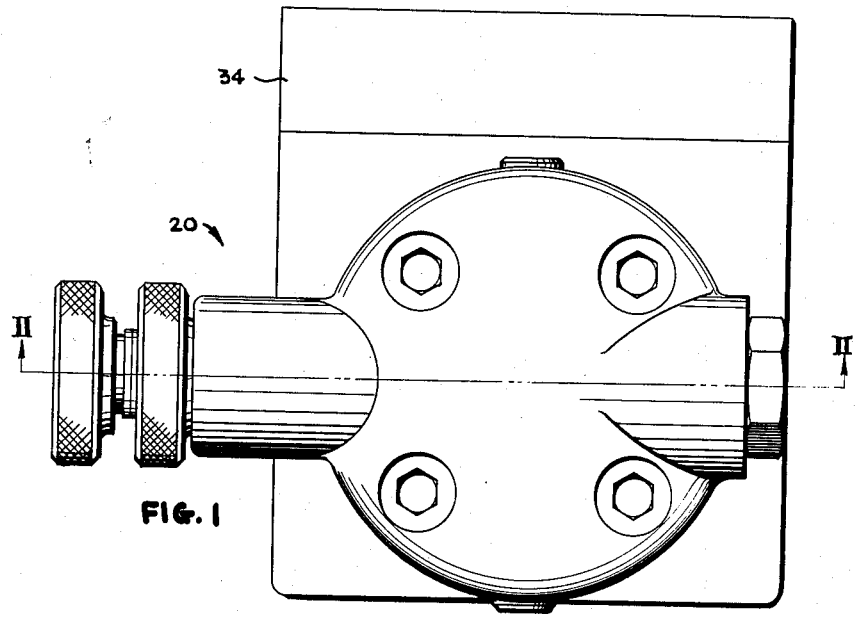
Fig. 1 is a plan view of a valve formed in accordance with the present invention.
Figure 2:
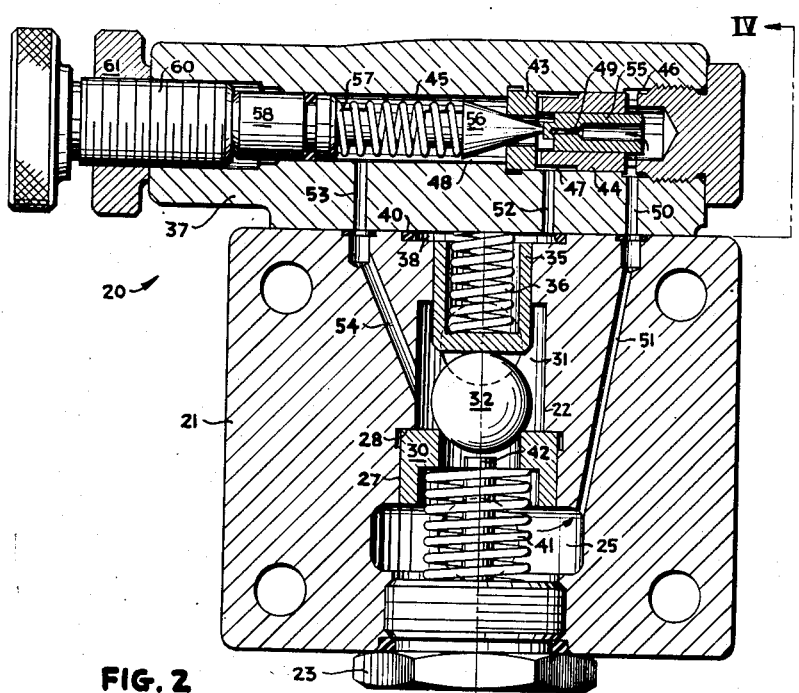
Fig. 2 is a vertical longitudinal sectional view taken through the valve shown in Fig. 1 on the plane indicated by the line II—II of Fig. 1.

Referring more particularly to the drawings, the numeral 20 designates the valve in its entirety. The valve includes a body 21 which is of block-like form and is provided with a central bore 22 extending from the bottom to the top of the body. This bore is counterbored at a number of points to provide sections of different diameters, the section at the lower end of the bore being threaded for the reception of a cap 23. The section immediately above the threaded section is enlarged to provide a chamber 25 with which the laterally extending inlet port 26 is connected. From the chamber 25, a slightly reduced section 27 of the bore extends upwardly to a shoulder 28 which is provided for locating a valve seat insert 30 disposed for sliding movement in the chamber section 27. The insert 30 closely fits the bore section 27 to prevent the flow of fluid between the insert and the body wall. Due to the provision of the shoulder 28, the bore is slightly further reduced throughout a portion 31 which receives a ball-shaped valve element 32. The chamber section 31 is connected with a laterally extending outlet port 33, the ports 26 and 33 opening to one side of the body 21.

This side of the body is finished for engagement with a mounting or sub-plate 34, the plate 34 being formed with suitable openings which register with the ports 26 and 33 and are formed for connection with portions of a hydraulic circuit, these portions being adapted to contain fluid under contrasting pressures. Ordinarily the portion of the system communicating with port 26 contains fluid under a higher pressure, this portion of the system generally communicating with the system pump or other pressure supplying means. When the valve is employed as a relief valve, the portion of the system communicating with the port 33 generally communicates with the reservoir and contains fluid at low or substantially atmospheric pressure.

The upper portion of the bore 22 is still further reduced to slidably receive a plunger 35, this plunger being, in this instance, of cup-shaped form to receive a compression type spring 36, the spring engaging the inner closed end of the cup and a pilot valve housing 37 which is removably secured to the upper end of the body 21 and serves to close the open upper end of the bore 22. The face of the body 21 which is engaged by the member 37 is counterbored as at 38 and receives a sealing ring 40 to prevent loss of fluid between the body and the housing 37. The housing 37 encloses a pilot valve which is employed to regulate the pressure in the counterbored portion 38 of the bore 22. In the following part of this description, this portion of the bore is designated as the control pressure section. It is in open communication with the interior of the plunger 35. Fluid pressure in this control pressure section tends to force the plunger 35 in a downward direction causing the lower end to engage and urge the ball valve 32 into engagement with the seat insert 30, this engagement preventing communication between the chamber 25 and the outlet port 33.

The valve seat insert 30 is yieldably held against the shoulder 28 by a coil spring 41 which is disposed in engagement with the underside of the insert and the inner surface of the cap 23. This cap is also provided with a central projection 42 which extends toward the ball valve 32 and terminates in slightly spaced relation therefrom when the ball is in engagement with the seat and the latter is in engagement with the shoulder 28. The purpose of the projection 42 will be set forth hereinafter.

As previously mentioned, the housing 37 encloses a pilot valve mechanism. This mechanism includes a valve seat insert 43 and guide 44 which divide a longitudinally extending bore 45 in the housing 37 into a plurality of pressure zones 46, 47 and 48. The first of these pressure zones communicates through small passages 50 and 51 with the chamber 25 which is connected with the inlet port 26. The pressure zone 47 may be termed an intermediate pressure zone, it being connected by a passage 52 with the control pressure section 38 of the bore 22. The pressure section 48 is connected by passages 53 and 54 with the portion of the bore 22 communicating with the outlet port 33. Communication between the pressure sections 46 and 47 is established through a restricted orifice 49 formed in a push-off piston 55 disposed for sliding movement in the guide 44, one end of this push-off piston engaging the reduced end of a conical poppet type valve 56 which engages the valve seat insert 43 on the outlet side thereof in the pressure zone 48. This conical poppet valve is urged toward the seat 43 by a coil spring 57, the tension of which is varied through the adjustment of an abutment member 58 positioned for sliding movement in the end of the bore 45. The abutment member is adjusted by threaded screw 60, the positions of which are maintained by a locknut 61.

In the operation of the valve, fluid under pressure is supplied through the port 26 to the chamber 25. This fluid pressure is supplied to the control pressure section through the passages 51, 50, the reduced orifice in the push-off piston 55 and the passage 52. As this pressure increases, it will be applied to the underside of the valve 32 and will tend to force this valve away from the seat 30. The valve is maintained on the seat, however, because the same pressure exists in the control pressure section and is applied to the upper side of the ball valve 32 through the plunger 35, this pressure being augmented by the force of the coil spring 36. It will be noted that the plunger 35 is slightly larger in diameter than the opening in the seat 30, therefore, the force tending to move the valve toward a closed position will exceed the force applied to the ball 32 through the opening in the valve seat and tending to unseat the ball. As pointed out above, the force tending to hold the ball down is supplemented by the force of the spring 36. When the force of the pressure in the inlet and control pressure sections of the valve starts to exceed the pressure setting of the pilot valve 56, however, this valve will start to move toward an open position to permit fluid to flow from section 47 of the bore 45 to section 48 from which it will flow to exhaust. As the pressure in the inlet continues to increase, this flow will also increase until valve 56 is moved far enough away from its seat to permit fluid pressure to escape from the control pressure section 38. Valve 56 is also urged from its seated position by the push-off piston 55 which is subjected to pressure differentials at opposite ends when the flow through the reduced orifice therein is sufficient to cause a pressure drop, the higher pressure being in the zone 46 at the opposite end of the push-off piston from the valve 56. This push-off piston and the pilot valve functions in the manner set forth in the previously mentioned patent. When valve 56 is open sufficiently to permit fluid to flow from the control pressure section 38, the fluid pressure on the underside of the ball 32 exerts a force sufficient to cause the ball 32 to move the plunger 35 in an upward direction. When these elements move in this manner, the ball 32 will be spaced from the seat 30 and fluid may flow directly from the inlet chamber 25 to the outlet port 33. Fluid flowing in this manner will maintain the ball valve spaced from the seat until the fluid pressure has decreased enough to permit spring 57 to return valve 56 into engagement with seat 43. At this time fluid at inlet port pressure will then be conducted to the control pressure section and plunger 35 will then return ball valve 32 into engagement with seat 30 to prevent fluid flow from chamber 25 to the outlet port.

One of the features of this invention is the construction of the valve in such a manner that, in the event the pressure in the port 33 should exceed the pressure in port 26, communication may be established between these ports. As previously described, valve seat insert 30 is disposed for sliding movement in the portion 27 of the bore 22. This valve seat insert is exposed to the pressure in the outlet port 33 and is yieldably held against movement in response to such pressure by coil spring 41. This coil spring is stronger than the spring 36 so that the valve seat insert will be held against the shoulder 28 at all times under normal operating conditions. When fluid pressure, however, increases sufficiently in port 33 to exceed the total force of the pressure in port 26 and spring 41, valve seat insert 30 will be moved in a downward direction. As it moves in this direction, ball valve 32 will engage the projection 42 and continued movement of the seat 30 will cause the ball 32 to be spaced therefrom as indicated in Fig. 5. Fluid may then flow from the port 33 to the port 26 until the pressures in these ports are substantially equalized. Spring 41 will then move insert 30 into engagement with shoulder 28 and ball valve 32 will again be seated.

From the foregoing, it will be apparent that a novel valve construction has been provided which will permit the usual operation as a pressure relief, sequence or unloader valve and, when unusual conditions occur in the system, the valve will operate to establish reverse flow, this condition of operation being maintained until the normal condition is again established.

While the form of embodiment of the present invention as herein disclosed constitutes a preferred form, it is to be understood that other forms might be adopted, all coming within the scope of the claims which follow.

I claim:

1. A fluid pressure control valve comprising a body with an internal bore, a control pressure chamber and spaced inlet and outlet ports communicating with said bore; a valve seat insert disposed in said bore between said ports; resilient means yieldably urging said insert toward a predetermined position, said insert being responsive to a higher pressure in said outlet than in said inlet to move in opposition to said resilient means; a valve element engaging said seat insert on the outlet port side; a spring-pressed plunger urging said valve element toward said seat insert, said plunger being responsive to the pressure in said control pressure chamber; means for disengaging said valve from said insert when the latter is moved in opposition to said resilient means; and a pilot valve responsive to the pressure in said inlet port to regulate the pressure in said control pressure chamber.

2. A fluid pressure control valve comprising a body with an internal bore, a control pressure chamber and spaced inlet and outlet ports communicating with said bore; a valve seat insert disposed in said bore between said ports; resilient means yieldably urging said insert toward a predetermined position, said insert being responsive to a higher pressure in said outlet than in said inlet to move in opposition to said resilient means; a ball valve element engaging said seat insert on the outlet port side; a spring-pressed plunger urging said ball valve element toward said seat insert, said plunger being responsive to the pressure in said control pressure chamber; means for disengaging said ball valve from said insert when the latter is moved in opposition to said resilient means; and a pilot valve responsive to the pressure in said inlet port to regulate the pressure in said control pressure chamber.

3. A fluid pressure control valve comprising a body with an internal bore, a control pressure chamber and spaced inlet and outlet ports communicating with said bore; locating means in said body between said inlet and outlet ports; a valve seat insert disposed in said bore for movement toward and away from said locating means; spring means urging said insert toward said locating means, said insert being movable in opposition to said spring means by an excess of pressure in said outlet port over said inlet port; a valve element engaging said seat insert on the outlet port side; a spring-pressed plunger urging said valve element toward said seat insert, said plunger being responsive to the pressure in said control pressure chamber; stop means for limiting the movement of said valve element when said insert moves in opposition to said spring means; an a pilot valve responsive to the pressure in said inlet port to regulate the pressure in said control pressure chamber.

4. A fluid pressure control valve comprising a body with an internal bore, a control pressure chamber and spaced inlet and outlet ports communicating with said bore; locating means in said body between said inlet and outlet ports; a valve seat insert disposed in said bore for movement toward and away from said locating means; spring means urging said insert toward said locating means, said insert being movable in opposition to said spring means by an excess of pressure in said outlet port over said inlet port; a valve element engaging said seat insert on the outlet port side; a plunger supported in said body for movement toward and away from said valve element, said plunger being responsive to the pressure in said control pressure chamber; a second spring means urging said plunger and valve element toward said seat insert, the second spring means being weaker than the first-mentioned spring means; means for restricting the movement of said valve element when said seat insert moves away from said locating means; and a pilot valve responsive to the pressure in said inlet port to regulate the pressure in said control pressure chamber.

WENDELL E. RENICK.

References Cited in the file of this patent

UNITED STATES PATENTS

| Number | Name | Date |
|--------|------|------|
| 1,994,974 | Widemann | Mar. 19, 1935 |
| 2,451,586 | Strid | Oct. 19, 1948 |
| 2,571,667 | Bondurant | Oct. 16, 1951 |
| 2,580,128 | Renick | Dec. 25, 1951 |